(12) United States Patent
Hashimoto et al.

(10) Patent No.: US 7,221,119 B2
(45) Date of Patent: May 22, 2007

(54) ROBOT SYSTEM

(75) Inventors: Yoshiki Hashimoto, Hadano (JP); Yoshiyuki Kubo, Yamanashi (JP); Nobuo Chino, Yamanashi (JP); Shuntaro Toda, Yamanashi (JP)

(73) Assignee: Fanuc Ltd, Yamanashi (JP)

( * ) Notice: Subject to any disclaimer, the term of this patent is extended or adjusted under 35 U.S.C. 154(b) by 0 days.

(21) Appl. No.: 10/663,695

(22) Filed: Sep. 17, 2003

(65) Prior Publication Data

US 2004/0061466 A1  Apr. 1, 2004

(30) Foreign Application Priority Data

Sep. 30, 2002  (JP) .............................. 2002-287013

(51) Int. Cl.
  *G05D 3/00*  (2006.01)
  *H02P 3/00*  (2006.01)
(52) U.S. Cl. ................. 318/468; 318/568.16; 318/563; 318/467; 340/500; 700/245; 700/255
(58) Field of Classification Search ........ 318/466–470, 318/560, 486, 449–450, 565, 567, 568.11, 318/568.12, 568.16; 901/46–50, 1–10, 23–24, 901/19
See application file for complete search history.

(56) References Cited

U.S. PATENT DOCUMENTS

| 4,386,341 | A | * | 5/1983 | Yamamoto | 340/384.71 |
|---|---|---|---|---|---|
| 4,523,135 | A | * | 6/1985 | Kogawa | 318/565 |
| 4,818,866 | A | * | 4/1989 | Weber | 250/221 |
| 4,870,592 | A | * | 9/1989 | Lampi et al. | 700/112 |
| 4,912,384 | A | * | 3/1990 | Kinoshita et al. | 318/569 |
| 5,204,942 | A | * | 4/1993 | Otera et al. | 700/248 |
| 5,280,622 | A | * | 1/1994 | Tino | 700/255 |
| 5,428,279 | A | * | 6/1995 | Sugimoto et al. | 318/563 |
| 5,576,972 | A | * | 11/1996 | Harrison | 702/128 |
| 5,703,452 | A | * | 12/1997 | Futsuhara | 318/558 |
| 5,705,906 | A | * | 1/1998 | Tanabe et al. | 318/568.13 |
| 5,798,703 | A | * | 8/1998 | Sakai et al. | 340/666 |
| 5,903,123 | A | * | 5/1999 | Shimogama | 318/568.13 |
| 5,956,465 | A | * | 9/1999 | Takagi et al. | 700/255 |
| 6,084,367 | A | * | 7/2000 | Landert | 318/466 |

(Continued)

FOREIGN PATENT DOCUMENTS

JP  61-61195  4/1986

OTHER PUBLICATIONS

Notice of Reason for Rejection dated Sep. 27, 2004.

*Primary Examiner*—Lincoln Donovan
*Assistant Examiner*—Renata McCloud
(74) *Attorney, Agent, or Firm*—Staas & Halsey LLP

(57) ABSTRACT

In a case in which an operation is alternately carried out by apparatus-1 and the apparatus-2 in cooperation with a robot, an operator carries out operation within an operation range of each of the apparatuses during the interruption of power supply to the apparatus-1 and the apparatus-2. Even if the operator approaches or enters the apparatus-1 or the apparatus-2, an emergency stop unit is not informed of a notice of such approach or entry as far as the interruption of power to the apparatus is confirmed. In a state in which the interruption of power is not confirmed, on the other hand, the emergency stop unit is informed of the notice of operator's approach or entry, and the robot system is emergency stopped.

6 Claims, 5 Drawing Sheets

U.S. PATENT DOCUMENTS 6,480,760 B1* 11/2002 Doi .......................... 700/245
6,683,432 B2* 1/2004 Griffis ................... 318/568.16
6,907,317 B2* 6/2005 Peshkin et al. ............. 700/245
2003/0050735 A1* 3/2003 Griffis ....................... 700/255
2005/0063114 A1* 3/2005 Suhara et al. ................. 361/62

* cited by examiner

ROBOT SYSTEM

BACKGROUND OF THE INVENTION

1. Field of the Invention

The present invention relates to a robot system, and more particularly to a technique for securing operator's safety in a robot system comprising a robot which is controlled by a robot controller, and at least one apparatus which is driven by a servomotor and carries out operation in cooperation with the robot.

2. Description of the Related Art

A robot controlled by a robot controller is driven by a servomotor, and the robot is used in a form of a robot system in which the robot is combined with another apparatus which carries out operation in cooperation with the robot in many cases. The number of apparatuses which cooperates with the robot is not limited to one, and a plurality of apparatuses are used in some cases.

In such a robot system, there exist an operation region such as a work stage which is driven by the servomotor, and a region (hereinafter referred to as "off-limits region") where an operator is prohibited from entering for his or her own safety during the operation of the apparatus. Therefore, a technique for securing operator's safety is conventionally employed for an operator who approaches a dangerous apparatus or who enters the off-limits region.

FIG. 1 is a diagram for explaining the technique for securing safety which has conventionally been employed generally. In the example shown in FIG. 1, the robot system includes one robot, and apparatus-1 and apparatus-2 which are driven by servomotors, respectively. Power is supplied to the servomotors of the apparatus-1 and apparatus-2 by servo amplifiers provided in the apparatus-1 and apparatus-2, respectively. The robot is provided with a servo amplifier for a robot which supplies power to the servomotor. The operation of these servo amplifiers are controlled (including ON and OFF of power supply) by a robot controller.

Here, power to the servomotors of the apparatus-1 and the apparatus-2 are supplied through connection/interruption units provided in the apparatuses which are driven by the servomotors. The connection/interruption of power supply by each the connection/interruption unit is different from the connection/interruption control by means of the robot controller. The connection/interruption units are connected to the operator approach/entry detection units provided for the apparatus-1 and the apparatus-2, and when a notice that an operator approaches or enters is received from the approach/enter detection unit, the power supply to the servomotor is immediately interrupted.

As a unit for interrupting the power, a unit shown in FIG. 2 has already been established. As shown in FIG. 2, an essential portion of this unit comprises relays (their contacts are indicated as KA1, KA2, KA3) called safety relays or forcibly guiding type relays, and contactors (their contacts are indicated as KM1, KM2). A reference symbol M represents a servomotor of the apparatus-1 or apparatus-2. The open and close state of each contact in the drawings indicates that no operator's invasion is detected and power supply to the servomotor is being interrupted.

When the servomotor is being operating in a state in which operator's entry is not detected, the contacts of the relays KA1 and KA2 are closed, and the contacts of the relay KA3 maintains the illustrated state. With this operation, the contactors KM1 and KM2 are energized, and contacts of the contactors KM1 and KM2 provided in the power supply circuit to the servomotor are closed.

Here, if operator's entry is detected, the contacts of the relays KA1 and KA2 are opened, and electricity to the contactors KM1 and KM2 is interrupted. As a result, power supply to the servomotor is interrupted, and operator's safety is secured.

As illustrated in the drawings, all of the contacts of the relays KA1 and KA2 and the contactors KM1 and KM2 are made duplex, and even if a single contact breaks down, safety is secure. That is, even if one of the relays KA1 and KA2 breaks down, the power supply-interrupting function is not lost. It is possible to detect a single one of the relays KA1 and KA2 using the relay KA3. It is also possible to detect failure of the relay KA3 as far as the relays KA1 and KA2 are in normal states.

The related art is described in Japanese Patent Application Laid-open No. 59-159498. In this publication, there is described a technique that a doorway for access to a machine such as a robot is provided with photoelectric switches doubly, these double photoelectric switches detect that an operator approaches the machine from the doorway, and in accordance with the detection, the machine is automatically stopped.

In this conventional technique, a circuit structure for reliably interrupting power as described above is required. More specifically, the circuit in which a safety relay (forcibly guiding type relay) and a plurality of contactors are incorporated is required, as explained above. In this case, since special parts such as the safety relay are required, the number of parts is increased and thus, there is a problem concerning costs and reliability.

SUMMARY OF THE INVENTION

According to the present invention, a robot system comprising a robot, and at least one apparatus which is driven by a servomotor and carries out operation in cooperation with the robot further comprises the following units:

(1) a detection unit for detecting operator's approach to the specified apparatus including at least one apparatus which carries out operation in cooperation with the robot or operator's entry to an off-limit region set for the specified apparatus, provided for each specified apparatus;

(2) a unit for connecting/interrupting power supply to the servomotor which drives the specified apparatus, provided for each specified apparatus;

(3) an emergency stop unit for receiving a notice of operator's approach or entry from the detection unit to bring the robot system into an emergency stopped state; and (4) a unit for monitoring, for each specified apparatus, a connection/interruption state of power supply to the servomotor which drives the specified apparatus, and canceling the notice from the detection unit to the emergency stop unit, for the specified apparatus to which power supply is interrupted.

With this structure, even if there is no reliability in the interruption of power to the servomotor, safety of the same level of that of the conventional technique can be secured, and an extremely simple interrupting circuit can be applied. Therefore, redundant interrupting circuit or special parts which are required in the conventional technique become unnecessary.

The specified apparatus may further include the robot. In this case, for this robot also, operator's safety can be secured in the same manner as that of the apparatus which is driven by other servomotor.

BRIEF DESCRIPTION OF THE DRAWINGS

The features of the present invention will become apparent from the following explanation of embodiments with reference to the accompanying drawings, in which.

DESCRIPTION OF THE EMBODIMENTS

Two embodiments to which the present invention is applied, and examples of a circuit used for an operator approach/entry detection unit used in the embodiments will be explained below.

First Embodiment

Figure 1:
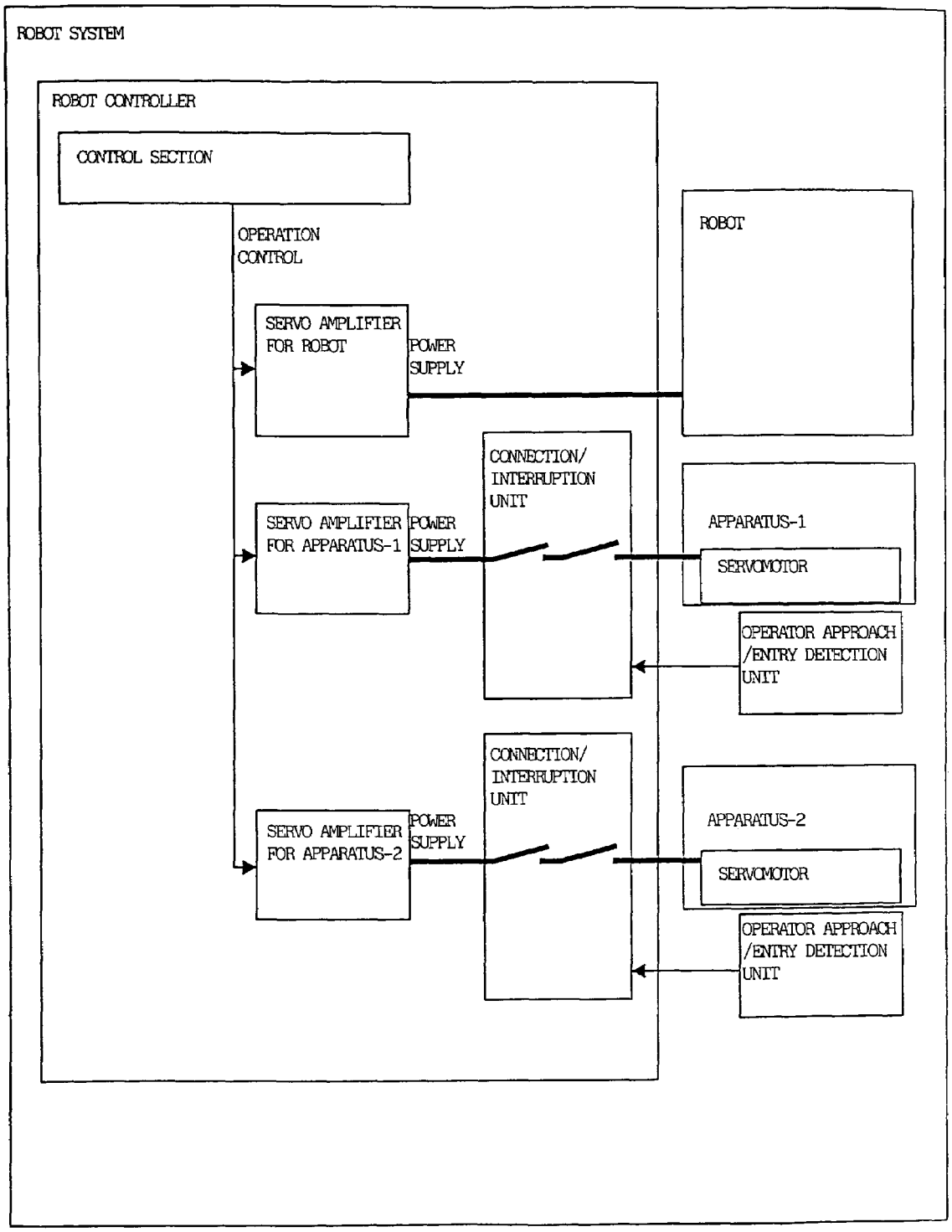
FIG. 1 is a diagram for explaining a conventional robot system for securing safety.
Figure 2:
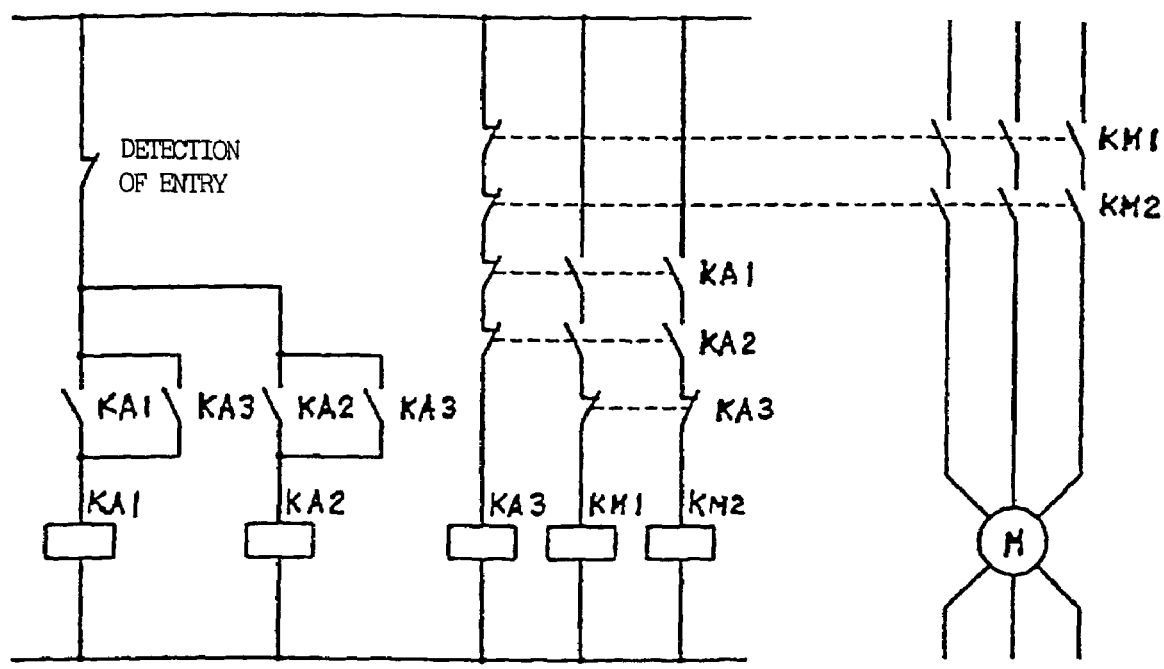
FIG. 2 is a diagram for explaining a power interrupting unit used in the conventional system.
Figure 3:
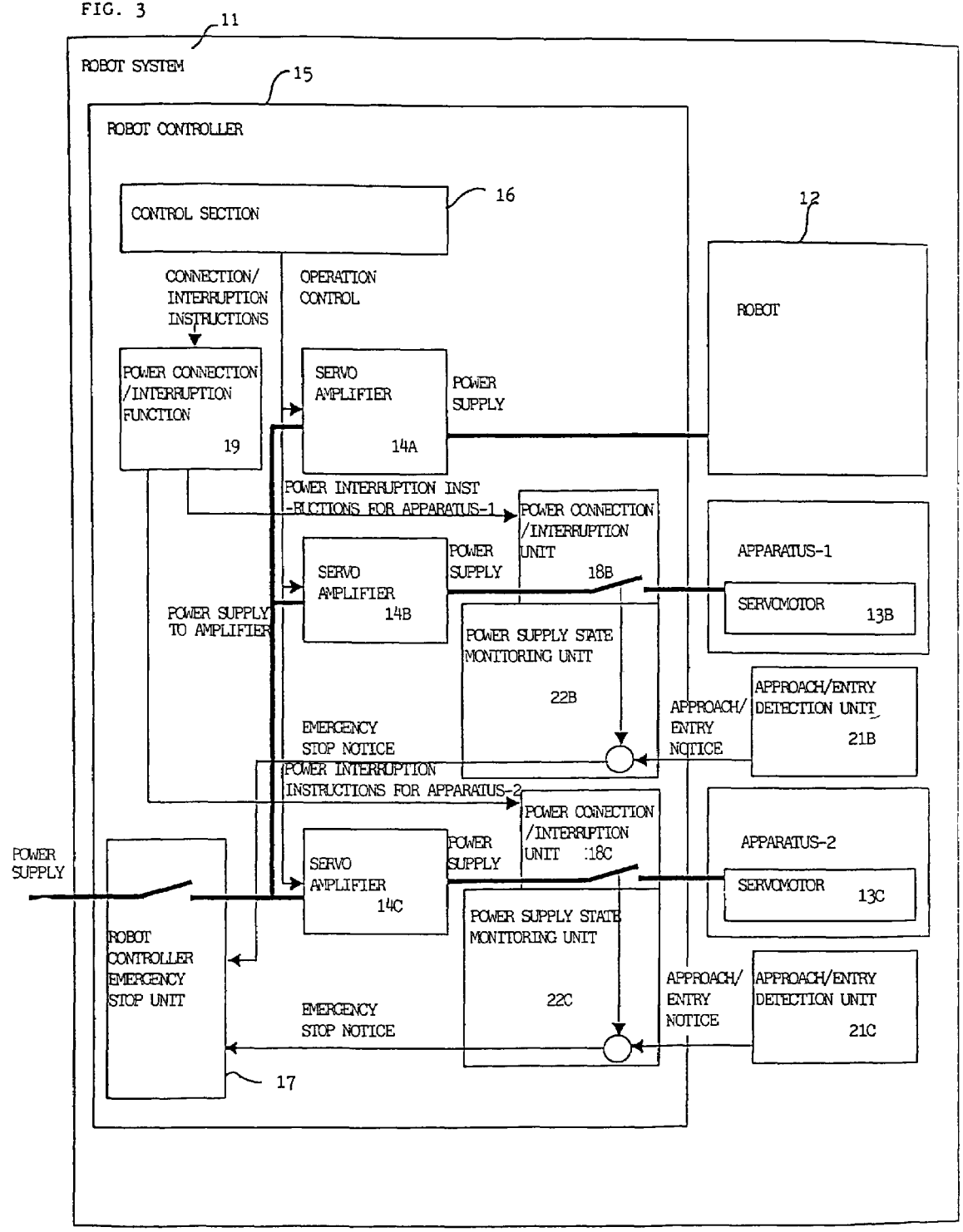
FIG. 3 is a diagram for explaining a robot system according to a first embodiment.

FIG. 3 schematically shows an outline of a robot system of the first embodiment. As shown in FIG. 3, a robot system 11 of this embodiment includes one robot 12, and apparatus-1 and apparatus-2 which are driven by servomotors 13B and 13C, respectively. Power is supplied to a servomotor (not shown) of the robot 12 by the servo amplifier 14A. Power is supplied to the servomotors 13B and 13C of the apparatus-1 and apparatus-2 by servo amplifiers 14B and 14C.

The servo amplifiers 14A to 14C are generally controlled by a robot controller 15. In FIG. 3, a control section 16 carries out a general control function of the robot controller 15 and provides instructions of connection/interruption of power supply which will be described later.

The robot controller 15 is provided with a robot controller emergency stop unit 17 for interrupting the power supply to the servo amplifiers 14A to 14C. The robot controller emergency stop unit 17 is driven when a later-described "notice of approach or entry" is received, and stops the power supply by means of the respective servo amplifiers 14A, 14b, 14C.

The robot controller emergency stop unit 17 stops the robot system 11 by a signal which is outputted at the time of interference of the robot 12, for example.

In the robot controller 15, there are provided power connection/interruption units 18B and 18C interposed between the apparatus-1 and apparatus-2 and the servo amplifiers 14B and 14C of the apparatus-1 and apparatus-2, and a power connection/interruption function 19 which controls servomotor power connection/interruption operation by the respective power connection/interruption units 18B and 18C. The power connection/interruption function 19 receives "power supply connection/interruption instructions" from the control section 16, and allows the connection/interruption units 18B and 18C to operate in accordance with contents of the instructions.

Operator approach/entry detection units 21B and 21C are provided for the apparatus-1 and the apparatus-2 so that an approach/entry notice is outputted when operator's approach/entry is detected. In accordance with features of the present invention, power supply state monitoring units 22B and 22C are provided in the robot controller 15. The power supply state monitoring units 22B and 22C monitor connection/interruption state of the power supply to the servomotors and, in case where the power supply is in interrupted state, prevent the notice of operator's approach/entry from inputting to the robot controller emergency stop unit 17.

Since the power supply state monitoring units 22B and 22C are provided in the robot controller 15, when the approach/entry notice is outputted from the operator approach/entry detection units 21B and 21C, if the power supply is in connected state, the robot controller emergency stop unit 17 is informed of the approach/entry notice, but if the power supply is in interrupted state, the robot controller emergency stop unit 17 is not informed of the approach/entry notice.

When the operation is carried out under the above structure and function, it is possible to proceed the operation without any trouble while securing the safety for operators in the following manner.

First, the robot 12 and the apparatus-1 cooperatively operate, and if the operation is completed, then the robot 12 and the apparatus-2 cooperatively operate. Thereafter, the cooperative operation of the robot 12 is carried out with the apparatus-1 and the apparatus-2 alternately. In this case, an operator carries out operation in an operation range of the apparatus-1 while the apparatus-1 stops (or during the interruption of power supply to the apparatus-1), and carries out operation in an operation range of the apparatus-2 while the apparatus-2 stops (or during the interruption of power supply to the apparatus-2).

The power interruption of the servomotors 13B and 13C is controlled by a servomotor power connection/interruption function 19 based on instructions of the control section 16 in the above-described series of operation.

If an operator approaches or enters the apparatus-1 and the apparatus-2 which are driven by the servomotors 13B and 13C, the operator approach/entry detection units 21B and 21C try to inform the emergency stop unit 17 of the operator's approach or entry.

At that time, if the interruption of power is confirmed, the power supply state monitoring units 22B and 22C prevent the robot controller emergency stop unit 17 from being informed of the approach or entry. Therefore, while the power supply to the apparatus-1 is interrupted, the operator can carry out the operation safely in the operation range of the apparatus-1 without any trouble. Similarly, while the power supply to the apparatus-2 is interrupted, the operator can carry out the operation safely in the operation range of the apparatus-2 without any trouble.

In a state in which the interruption of power is not confirmed, the power supply state monitoring units 22B and 22C do not prevent the robot controller emergency stop unit 17 from being informed of the approach/entry. As a result, the robot controller emergency stop unit 17 which has received the approach or entry notice interrupts the power supply to the servo amplifiers 14B and 14C for the apparatus-1 and the apparatus-2 and to the servo amplifier 14A for the robot 12. Therefore, the servomotors 13B and 13C for the apparatus-1 and the apparatus-2 are not operated and thus, danger is not posed to the operator.

When an operator enters the operation range or off-limits region of the apparatus-1 during the power supply to the apparatus-1, the apparatus-1 is immediately stopped together with the apparatus-2 and the robot 12 and thus, no danger is posed to the operator. Similarly, when an operator enters the operation range or off-limits region of the apparatus-2 during the power supply to the apparatus-2, the apparatus-2 is immediately stopped together with the apparatus-1 and the robot 12 and thus, no danger is posed to the operator.

Further, in a state in which the control section 16 outputs the power interruption instructions to the servomotors 13B and 13C, even if an operator approaches or enters the apparatus-1 and the apparatus-2 which are driven by the servomotors 13B and 13C and the power supply to the servomotor can not be interrupted due to failure of any parts or the like, the power supply state monitoring units 22B and 22C do not prevent the robot controller emergency stop unit from being informed of the approach or entry notice. With this configuration, the robot controller emergency stop unit 17 which has received the approach or entry notice interrupts the power supply to all of the servo amplifiers 14A to 14C. Therefore, the servomotor of the robot 12 and the servomotors 13B and 13C for the apparatus-1 and the apparatus-2 are not operated, and no danger is posed to the operator.

Second Embodiment

Figure 4:
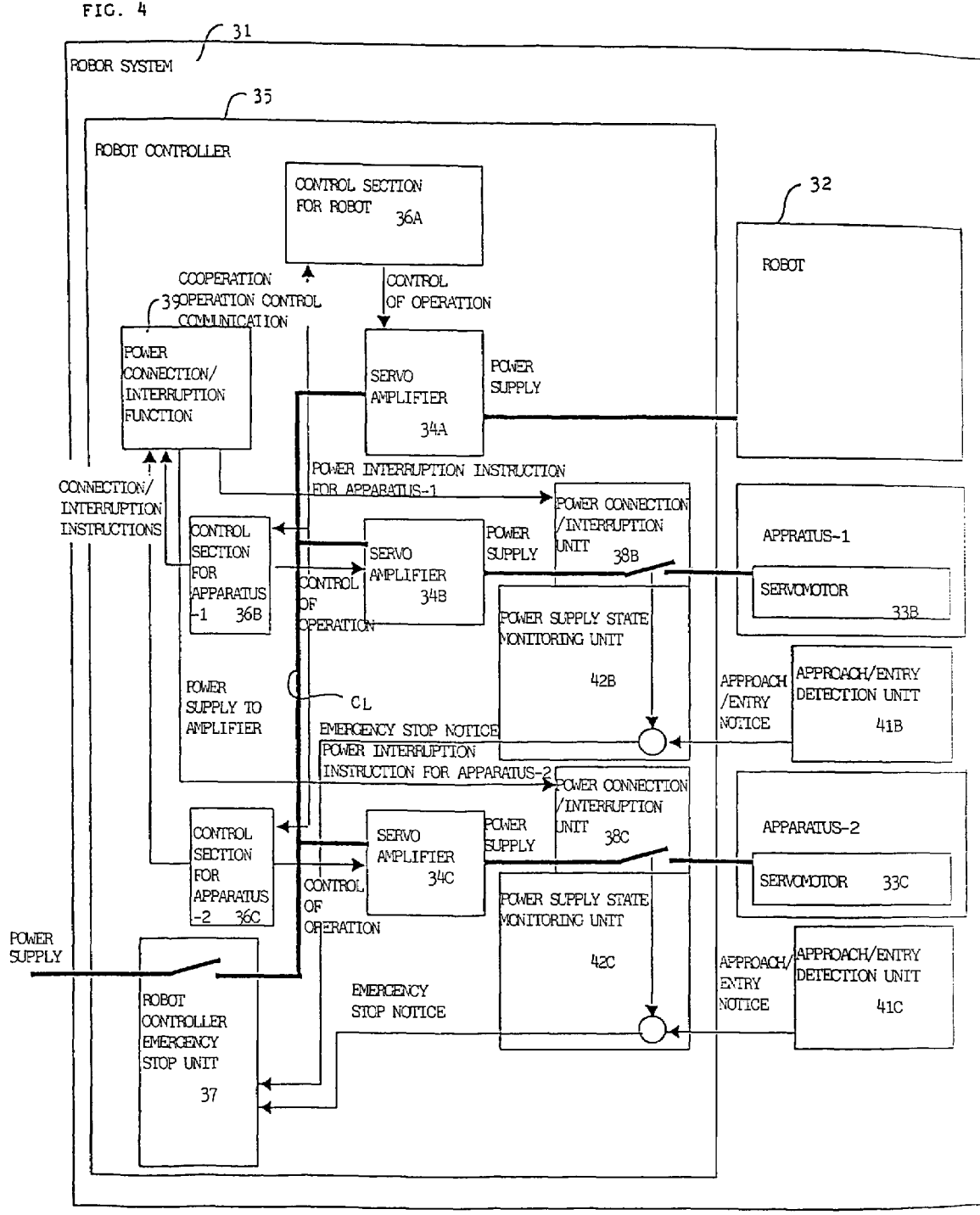
FIG. 4 is a diagram for explaining a robot system according to a second embodiment.

FIG. 4 shows an outline of a robot system according to the second embodiment. As shown in FIG. 4, a robot system 31 of this embodiment includes one robot 32, and apparatus-1 and the apparatus-2 which are driven by servomotors. Power is supplied to the servomotor (not shown) of the robot 32 by a servo amplifier 34A. Power is supplied to the servomotors 33B and 33C of the apparatus-1 and the apparatus-2 by the servo amplifiers 34B and 34C.

The servo amplifier 34A for the robot is controlled by a control section 36A for the robot. The servo amplifiers 34B and 34C for the apparatus-1 and the apparatus-2 are controlled by the control sections 36B and 36C for the apparatus-1 and the apparatus-2. The control sections 36A, 36B and 36C are provided in the robot controller.

The robot controller 35 is provided with a robot controller emergency stop unit 37 for interrupting the power supply to the servo amplifiers 34A, 34B and 34C. The robot controller emergency stop unit 37 is driven when it receives a later-described "notice of approach or entry", and stops the power supply by the respective servo amplifiers 34A, 34B and 34C.

The robot controller emergency stop unit 37 stops the robot system 31 by a signal which is outputted at the time of interference of the robot 32, for example.

Provided in the robot controller 35 are connection/interruption units 38B and 38C which are interposed between the apparatus-1 and the apparatus-2 and the servo amplifiers 34B and 34C for the apparatus-1 and the apparatus-2, and a power connection/interruption function 39 which controls the servomotor power connection/interruption operation by the respective connection/interruption units 38B and 38C. The power connection/interruption function 39 receives "power supply connection/interruption instructions" from the control sections 36B and 36C, and allows the connection/interruption units 38B and 38C to operate in accordance with contents of the instructions.

Operator approach/entry detection units 41B and 41C are provided for the apparatus-1 and the apparatus-2, and when operator's approach/entry is detected, the approach/entry notice is outputted. In accordance with features of the present invention, power supply state monitoring units 42B and 42C are provided in the robot controller 35. The power supply state monitoring units 42B and 42C monitors a connection/interruption state of power supply, and in case where the power supply is in interrupted state, the power supply state monitoring units 42B and 42C prevent the notice of operator's approach/entry from inputting to the robot controller emergency stop unit 37.

By providing the power supply state monitoring units 42B and 42C in the robot controller 35, when the approach/entry notice is outputted from the approach/entry detection units 41B and 41C, if the power supply is in the connected state, the robot controller emergency stop unit 37 is informed of the approach/entry notice, but if the power supply is in the interrupted state, the robot controller emergency stop unit 37 is not informed of the approach/entry notice.

Here, in this embodiment, the control section 36A for the robot, the control section 36B for the apparatus-1, the control section 36C for the apparatus-2 and the robot controller emergency stop unit 37 are connected to one another through communication lines CL for coordination. The communication lines CL are used for sending and receiving a signal for coordination between the robot and the respective apparatuses, and is used for sending instructions of interruption of power supply to the apparatus-1 and the apparatus-2 to the control sections 36B and 36C for the apparatus-1 and the apparatus-2 when the robot controller emergency stop unit 37 receives the approach/entry notice.

When the operation is carried out under the above structure and function, as the same manner as the first embodiment, it is possible to proceed the operation without any trouble while securing the safety for operators in the following manner.

First, the robot 32 and the apparatus-1 cooperatively operate, and if the operation is completed, the robot 32 and the apparatus-2 cooperatively operate. Thereafter, the cooperative operation of the robot 32 is carried out with the apparatus-1 and the apparatus-2 alternately. In this case, an operator carries out operation in an operation range of the apparatus-1 while the apparatus-1 stops (or during the interruption of power supply to the apparatus-1), and carries out operation in an operation range of the apparatus-2 while the apparatus-2 stops (or during the interruption of power supply to the apparatus-2).

The interruption of power of the servomotors 33B and 33C is controlled by the servomotor power connection/interruption function 39 according to the respective instructions of the control section 36A for the robot, the control section 36B for the apparatus-1 and the control section 36C for the apparatus-2 in the above series of operation. If an operator approaches or enters the apparatus-1 and the apparatus-2 which are driven by the servomotors 33B and 33C, the approach/entry detection units 41B and 41C try to inform the emergency stop unit of operator's approach or entry. At that time, in a state in which the interruption of power is confirmed, the power supply state monitoring units 42B and 42C prevent the robot controller emergency stop unit 37 from being informed of the approach or entry. Therefore, while the power supply to the apparatus-1 is interrupted, the operator can carry out the operation safely in the operation range of the apparatus-1 without any trouble. Similarly, while the power supply to the apparatus-2 is interrupted, the operator can carry out the operation safely in the operation range of the apparatus-2 without any trouble.

In a state in which the interruption of power is not confirmed, the power supply state monitoring units 42B and 42C do not prevent the robot controller emergency stop unit 37 from being informed of the approach/entry.

With this configuration, the robot controller emergency stop unit 37 which has received the notice of operator's approach or entry interrupts the power supply to the servo amplifier 34A for the robot, and sends instructions for interrupting the power supply to the control section 36B for the apparatus-1 and the control section 36C for the apparatus-2. As a result, power supply to the servo amplifier 34B and the servo amplifier 34c for the apparatus-1 and the apparatus-2 is interrupted, respectively. Therefore, the servomotors 33B and 33C do not operate, and no danger is posed to the operator.

If an operator enters the operation range or the off-limits region of the apparatus-1 during power supply to the apparatus-1, the apparatus-1 is immediately stopped together with the apparatus-2 and the robot, with the result that no danger is posed to the operator. Similarly, if an operator enters the operation range or the off-limits region of the apparatus-2 during power supply to the apparatus-2, the apparatus-2 is immediately stopped together with the apparatus-1 and the robot, with the result that no danger is posed to the operator.

Further, even if an operator approaches or enters the apparatuses driven by the servomotors 33B and 33C and the power supply to servomotors can not be interrupted due to failure of parts or the like in a state in which the control sections 36B and 36C outputs the power interruption instructions to the servomotors 33B and 33C, the power supply state monitoring units 42B and 42C do not prevent the robot controller emergency stop unit 37 from being informed of operator's approach or entry. With this configuration, the power supply to the servo amplifiers 34B and 34C is interrupted. Therefore, the servomotors 34B and 34C do not operate and no danger is posed to the operator.

Figure 5:
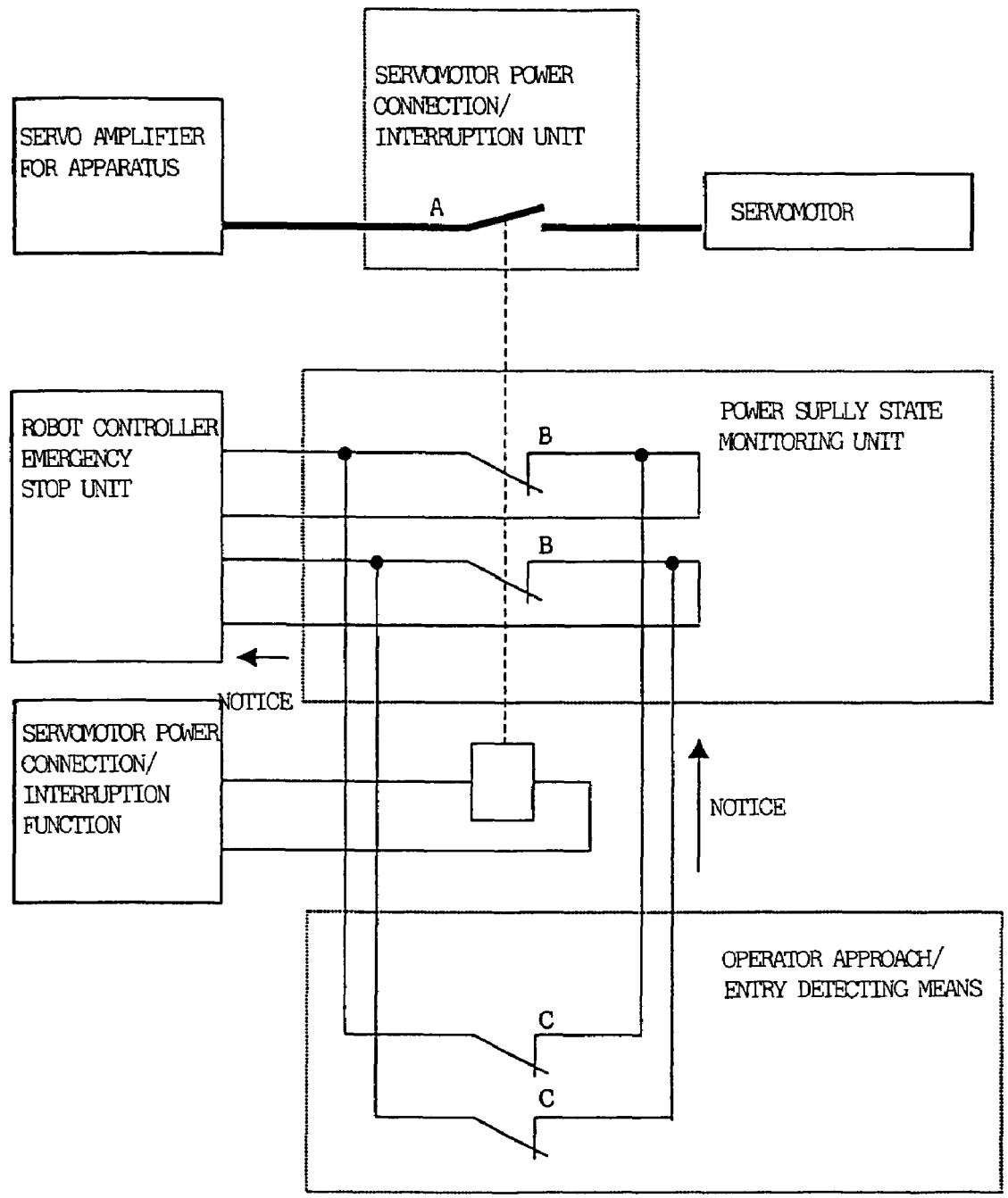
FIG. 5 is a diagram for explaining an example of a circuit which functions as a servomotor power connection/interruption unit, a power connecting state monitoring unit and an operator approach/entry detection unit in each robot system of the respective embodiments.

As explained above, although the servomotor power connection/interruption units 19 and 39, the power supply state monitoring unit 22B, 22C, 42B, 42C, and the operator approach/entry detection unit 21B, 21C, 41B, 41C are used in the robot systems in the respective embodiments, it is possible to constitute these units in a single circuit. FIG. 5 shows an outline of such a circuit.

In the circuit shown in FIG. 5, an auxiliary contact (b contact: shown with symbol B in the drawing) of the servomotor power connection/interruption unit is connected to the robot controller emergency stop unit. An output contact (c contact: shown with symbol C in the drawing) of the approach/entry detection unit is connected to the auxiliary contact B in parallel.

In a state in which a power interruption main contact (a contact: shown with symbol A in the drawing) of the servomotor is interrupted, the auxiliary contact B connected to the robot controller emergency stop unit is closed to function as a bypass circuit. As a result, the robot controller emergency stop unit does not operate, irrespective of whether the output contact C of the operator approach/entry detection unit is opened or closed.

Therefore, the operation can be carried out in the operating region such as the work stage of the like which is driven by a servomotor where the power is interrupted, or in the off-limits region without stopping the entire system.

In a state in which the power interruption main contact A of the servomotor is not interrupted, the auxiliary contact B connected to the robot controller emergency stop unit is in open state, and if the approach/entry is detected and the output contact C of the operator approach/entry detection unit is opened, the robot controller emergency stop unit is driven, and the entire system is brought into the emergency stopped state. With this configuration, safety for an operator who approaches or enters an operation range or an off-limits region is secured.

When the present invention is made concrete using the circuit shown in FIG. 5, the association or cooperation between the main contact A and the auxiliary contact B of the servomotor power connection/interruption unit becomes important. The association or the cooperation between the main contact A and the auxiliary contact B has already been technically established, and its reliability is extremely high. In the circuit of this embodiment, each of the auxiliary contact of the servomotor power connection/interruption and the output contact of the operator approach/entry detection unit is made duplex, respectively, thereby improving the safety of the circuit.

The two embodiments and the example of related circuit are explained above. In each of the embodiments, the power supply state monitoring unit 22B, 22C (42B, 42C), the servomotor power connection/interruption function 19 (39) and the robot controller emergency stop unit 17 (37), which are provided in the robot controller 15 (35), may be provided in any locations in the robot system, and all or a portion thereof maybe provided outside the robot controller.

The first or second embodiment may be modified such that the robot is dealt with in the same manner as the cases of the apparatus-1 and the apparatus-2. For example, an off-limits region is set around the robot, and then a detection unit for detecting operator's approach or entry to the off-limits region, a unit for connecting/interrupting power supply to a robot driving servomotor, and a unit for monitoring the connection/interruption state of the power supply to the robot driving servomotor and canceling the notice to the emergency stop unit in case where the power supply is interrupted, are provided in this modification and added to the first or second embodiment, in the same manner as in the case of the disposition of the approach/entry detection units for the apparatus-1 and the respective apparatus-2.

In this case, if the power supply to the robot servo amplifier is in interrupted state, the approach to the operation range of the robot or entry to the off-limits region of the robot is allowed, and if the power supply is connected, robot system is stopped based on the detection of the approach to the operation range of the robot or entry to the off-limits region of the robot.

According to the present invention, even if there is no reliability in the interruption of power to the servomotors, safety of the same level of that of the conventional technique can be secured, and an extremely simple interrupting circuit can be applied. Therefore, redundant interrupting circuit or special parts which are required in the conventional technique become unnecessary, and it is possible to reduce the costs and to enhance the reliability.

The invention claimed is:

1. A robot system comprising a robot, and at least one apparatus which is driven by a servomotor and carries out operation in cooperation with the robot, wherein the robot system further comprises:
   a detection unit to detect an operator's approach to the specified apparatus including at least one apparatus which carries out operation in cooperation with the robot or operator's entry to an off-limit region set for the specified apparatus and to output a notice of operator's approach or entry, provided for each specified apparatus; and
   a controller to control the robot, the controller comprising:
      a unit connecting and interrupting power supply to the servomotor which drives the specified apparatus, provided for each specified apparatus,
      an emergency stop unit receiving the notice of operator's approach or entry from the detection unit to bring the robot system into an emergency stopped state, wherein power supply to the robot and to each specified apparatus is automatically interrupted based upon the notice, and a monitoring unit for each specified apparatus to monitor a connection state and an interruption state of power supply to the servomotor which drives the specified apparatus, and canceling the notice of operator's approach or entry to prevent the notice from inputting to the emergency stop unit, for the specified apparatus when the power supply is interrupted by said unit connecting and interrupting power supply to the servomotor which drives the specified apparatus.

2. The robot system according to claim 1, wherein the specified apparatus further includes the robot.

3. A control apparatus for controlling a robot and at least one apparatus, comprising:

a detection unit to detect an operator's approach to the apparatus and to output a notice of operator's approach; and a controller to control the robot, the controller comprising:

a power unit corresponding to the apparatus, to connect and interrupt power supply to the apparatus, and an emergency stop unit to receive a the notice of the operator's approach from the detection unit, and to automatically interrupt power supply to the robot, and power supply to the apparatus via the corresponding power unit, based upon the received notice, wherein the notice is cancelled and prevented from being inputted to the emergency stop unit, when the power supply is interrupted by said power unit corresponding to the apparatus.

4. The control apparatus of claim 3, the controller further comprising a monitoring unit corresponding to the apparatus, to monitor a connection and an interruption of the power supply to the apparatus, wherein when the power supply to the apparatus is interrupted, the monitoring unit cancels the notice of the operator's approach received from the detection unit, thereby preventing the emergency stop unit from receiving the notice of the operator's approach.

5. The control apparatus of claim 3, wherein the apparatus comprises a plurality of apparatuses, wherein when an operator approaches one of the plurality of apparatuses, the power supply to all of the apparatuses and the robot is interrupted, respectively.

6. A control apparatus for controlling a robot and at least one apparatus, comprising:

a detection unit to detect an operator's approach to the apparatus and to output a notice of operator's approach; and a controller to control the robot, the controller comprising:

a power unit corresponding to the apparatus, to connect and interrupt power supply to the apparatus, and means for receiving the notice of the operator's approach from the detection unit, for automatically interrupting power supply to the robot, and power supply to the apparatus via the corresponding power unit, based upon the received notice, and for canceling the notice from the detection unit thereby preventing the notice from being inputted when the power supply is interrupted by said power unit of the apparatus.

* * * * *

UNITED STATES PATENT AND TRADEMARK OFFICE
CERTIFICATE OF CORRECTION

PATENT NO.       : 7,221,119 B2
APPLICATION NO.  : 10/663695
DATED            : May 22, 2007
INVENTOR(S)      : Yoshiki Hashimoto et al.

It is certified that error appears in the above-identified patent and that said Letters Patent is hereby corrected as shown below:

Sheet 4 of 5, Pointer 31 (FIG. 4), Line 1, change "ROBOR" to --ROBOT--.

Column 7, Line 4, change "34c" to --34C--.

Column 8, Line 18, change "maybe" to --may be--.

Column 9, Line 25, after "receive" delete "a".

Signed and Sealed this

Twentieth Day of November, 2007

JON W. DUDAS
*Director of the United States Patent and Trademark Office*